(No Model.)

W. B. HENDERSON.
COMBINED EGG BEATER AND DISH.

No. 298,375. Patented May 13, 1884.

WITNESSES
F. L. Ourand
E. G. Siggers

INVENTOR
Wm. B. Henderson
by C. A. Snow & Co.
Attorneys

N. PETERS, Photo-Lithographer, Washington, D. C.

United States Patent Office.

WILLIAM BOWEN HENDERSON, OF POTTSTOWN, PENNSYLVANIA.

COMBINED EGG BEATER AND DISH.

SPECIFICATION forming part of Letters Patent No. 298,375, dated May 13, 1884.

Application filed March 12, 1884. (No model.)

*To all whom it may concern:*

Be it known that I, WILLIAM B. HENDERSON, a citizen of the United States, residing at Pottstown, in the county of Montgomery and State of Pennsylvania, have invented a new and useful Egg Beater and Dish Combined, of which the following is a specification, reference being had to the accompanying drawings.

This invention has relation to an egg beater and dish combined, in which eggs may be beaten and removed from the dish, which may afterward be used for baking and other purposes; and it consists in the construction and novel arrangement of parts, as will be hereinafter fully described, and particularly pointed out in the claim.

Figure 1:
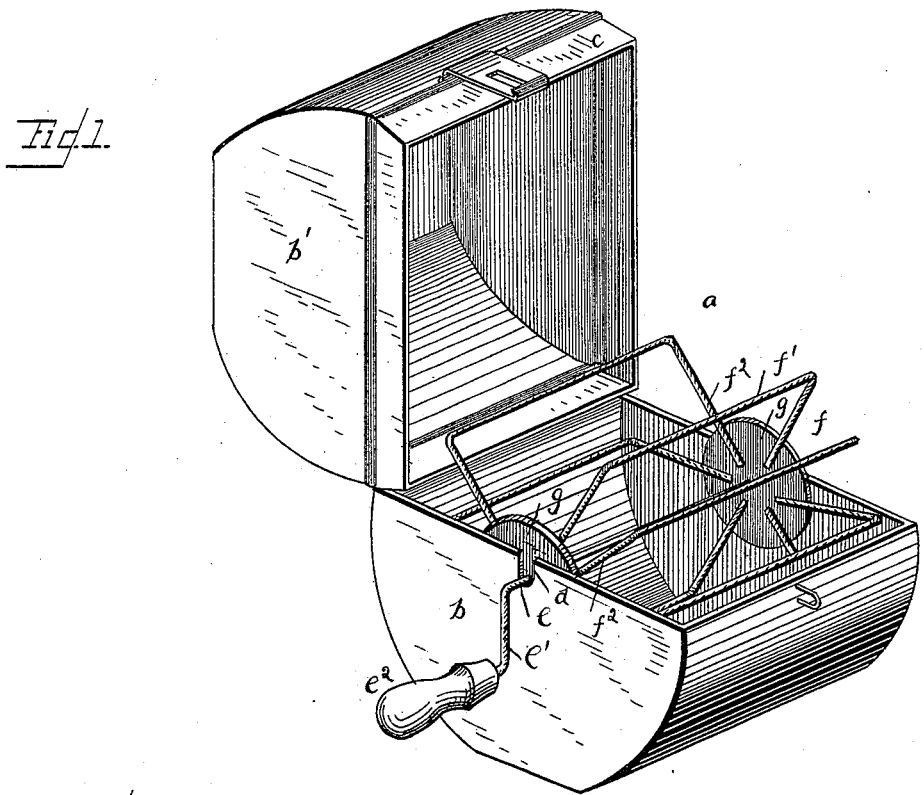
Figure 2:
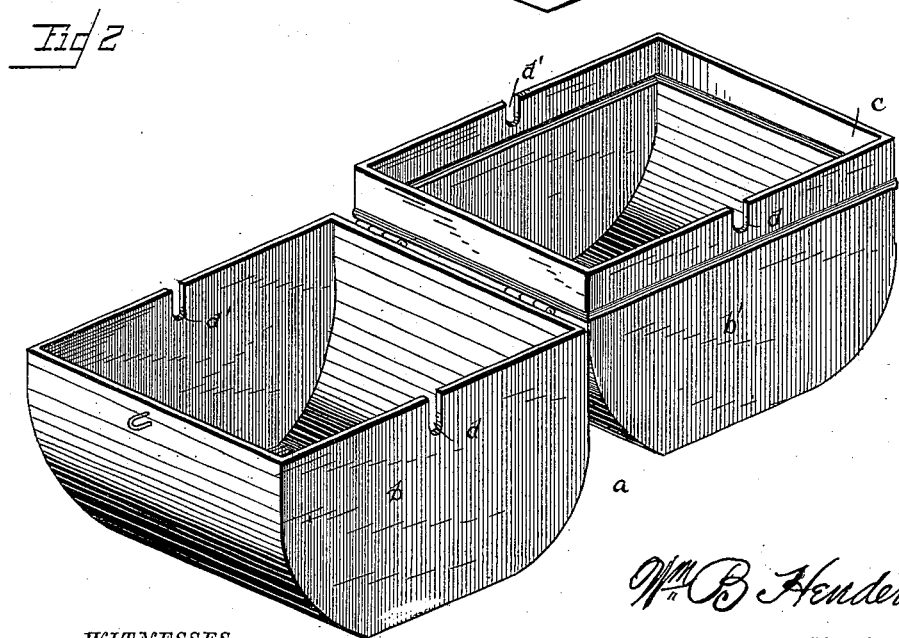

Figure 1 is a view in perspective of the device, partly open, arranged for use as an egg-beater; and Fig. 2 is a view of the dish entirely open, the beater being removed.

Referring by letter to the accompanying drawings, $a$ designates the dish, which is preferably made of tin in two sections or halves, $b\ b'$, hinged together at one side, so that the sections may be closed to form a closed dish or egg-receptacle, and provided at the other side with a staple on section $b$ and a hinged clasp on the section $b'$ to hold the sections closed. The mouth of the section $b'$ is provided with a surrounding flange, $c$, which, when the sections are closed, enters the mouth of the section $b$ and forms a tight joint all round, except at the notches $d\ d'$, in the ends of the sections $b\ b'$, which notches form the bearings for the shaft $e$ of the wire beater $f$. The beater $f$ is made of galvanized wire, bent angularly to form longitudinal arms $f'$, from the ends of which extend the radial arms $f^2\ f^2$, the ends of the latter arms being soldered to the inner faces of disks $g\ g$, fixed to the shaft $e$ of the beater, immediately inside of the walls of the dish, when the beater is in place. The shaft $e$ is provided with a crank, $e'$, at one end, on which is secured the loose wooden handle $e^2$. The wire beater is to be revolved within the closed dish to beat the eggs, and the dish is to be opened and the beater lifted out to remove the eggs after they have been beaten.

Among the advantages possessed by this beater over others in the market are the following: It is a combined egg beater and dish, which may be used either for beating eggs, or may be used as an open or closed dish for baking and other purposes, which will readily suggest themselves, thereby saving the expense of an extra dish. It is convenient in this form, and is therefore useful, in that it saves time in baking. By its use eggs may be beaten stiff quicker than by any other beater now in the market. It cannot get out of order, and a child can use it equally as well in beating eggs as an experienced baker could. It will beat one egg or one dozen eggs, and beat the latter nearly as quickly as the former. It may be easily cleaned by removing the beater from the dish. The beater, being made of galvanized wire, will not corrode, as the cast-iron beaters do, when in contact with the albumen of the eggs.

Having thus fully described my invention, what I claim as new, and desire to secure by Letters Patent, is—

The sectional dish having the sections hinged together, and provided with end notches and suitable fastenings, and the removable galvanized-wire beater, adapted to be rotated within the sectional dish, substantially as specified.

In testimony that I claim the foregoing as my own I have hereto affixed my signature in presence of two witnesses.

WILLIAM BOWEN HENDERSON.

Witnesses:
 WILLIAM PEOPLES,
 W. H. ANTRIM.